United States Patent
Lawall et al.

(10) Patent No.: US 7,367,626 B2
(45) Date of Patent: May 6, 2008

(54) OCCUPANT DETECTING SEAT ASSEMBLY WITH HEADREST AND METHOD OF MOVING HEADREST

(75) Inventors: Jennifer P. Lawall, Waterford, MI (US); Thomas Bernard Blake, Clinton Township, Macomb County, MI (US)

(73) Assignee: General Motors Corporation, Detroit, MI (US)

( * ) Notice: Subject to any disclaimer, the term of this patent is extended or adjusted under 35 U.S.C. 154(b) by 625 days.

(21) Appl. No.: 10/853,903

(22) Filed: May 26, 2004

(65) Prior Publication Data

US 2005/0264051 A1     Dec. 1, 2005

(51) Int. Cl.
*A47C 7/38* (2006.01)
(52) U.S. Cl. .................. 297/410; 297/216.12; 297/408
(58) Field of Classification Search ................. 297/408, 297/410, 216.12
See application file for complete search history.

(56) References Cited

U.S. PATENT DOCUMENTS

| | | | | |
|---|---|---|---|---|
| 3,397,911 A | * | 8/1968 | Brosius, Sr. ........... | 297/216.12 |
| 4,082,354 A | * | 4/1978 | Renner et al. ......... | 297/410 X |
| 4,935,680 A | * | 6/1990 | Sugiyama ............... | 297/410 X |
| 4,977,973 A | | 12/1990 | Takizawa .................... | 180/271 |
| 5,006,771 A | | 4/1991 | Ogasawara .............. | 318/568.1 |
| 5,095,257 A | | 3/1992 | Ikeda et al. .............. | 318/568.1 |
| 5,681,079 A | | 10/1997 | Robinson ...................... | 297/61 |
| 6,192,565 B1 | | 2/2001 | Tame ............................. | 29/61 |
| 6,746,078 B2 | * | 6/2004 | Breed ................ | 297/216.13 X |
| 6,890,029 B2 | * | 5/2005 | Svantesson ........ | 297/216.12 X |
| 2003/0090133 A1 | | 5/2003 | Nathan et al. ........... | 297/217.3 |

FOREIGN PATENT DOCUMENTS

WO    WO 2005068250 A1 *  7/2005

* cited by examiner

*Primary Examiner*—Anthony D. Barfield

(57) ABSTRACT

A seat assembly includes a seat and a headrest connected to the seat and movable between a first position and a second position with respect to the seat. The seat assembly also includes a biasing element biasing the headrest toward the second position. A releasable headrest restraining mechanism restrains the headrest in the first position when the seat is unoccupied and releases the headrest to permit movement of the headrest via the biasing element to the second position when the seat is occupied. A method of moving the headrest is also provided.

12 Claims, 3 Drawing Sheets

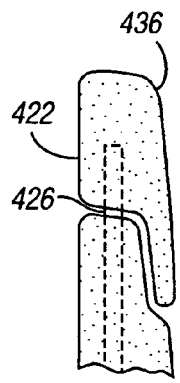
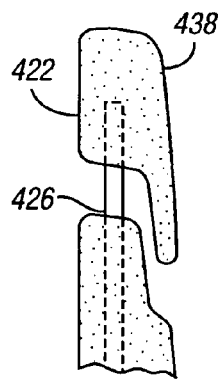
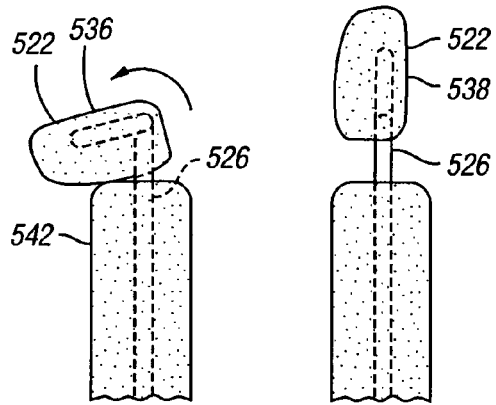
FIG. 6A    FIG. 6B    FIG. 7A    FIG. 7B
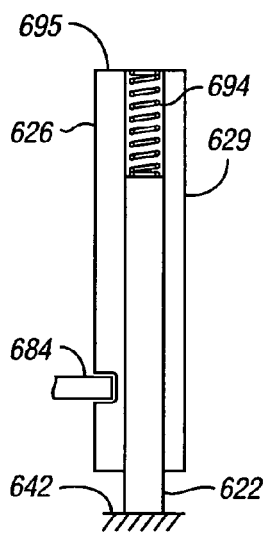
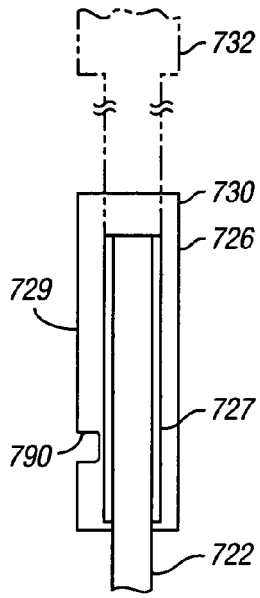
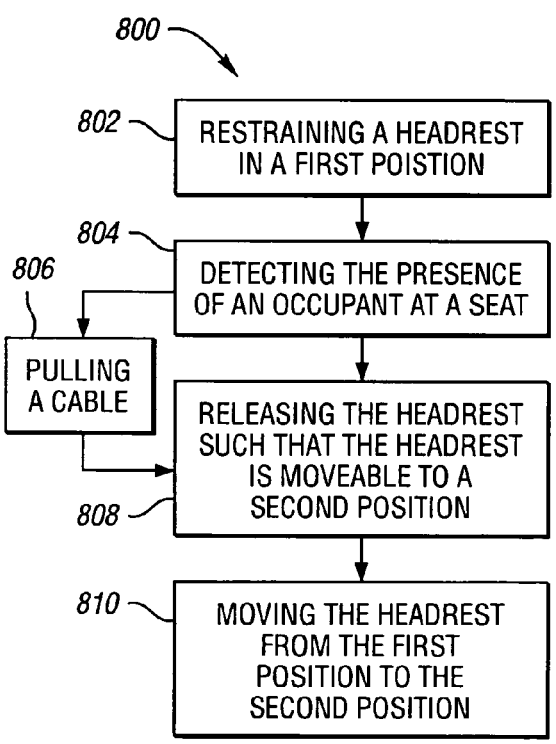
FIG. 8A    FIG. 8B    FIG. 9

OCCUPANT DETECTING SEAT ASSEMBLY WITH HEADREST AND METHOD OF MOVING HEADREST

TECHNICAL FIELD

The present invention relates to a seat assembly including a headrest.

BACKGROUND OF THE INVENTION

A seat assembly, such as a vehicle seat assembly, often includes a headrest connected to the seat. It is desirable to be able to move a vehicle headrest between a variety of positions for occupant comfort and for enhanced driver visibility. The art includes a variety of headrest positioning mechanisms.

SUMMARY OF THE INVENTION

A seat assembly includes a seat and a headrest connectable to the seat. The headrest is movable between a first position (i.e., a non-use position) and a second position. The seat assembly further includes a spring or biasing element operable for biasing the headrest toward the second position. The seat assembly further includes a releasable headrest restraining mechanism. The releasable headrest restraining mechanism is operable for restraining the headrest in the first position when the seat is unoccupied and for releasing the headrest to permit movement of the headrest to the second position via the biasing element when the seat is occupied. Preferably, the headrest extends further from the seat in the second position than in the first position. Thus, the first position may be a lowered, "non-use" position and the second position may be a raised "use" position. Accordingly, if the seat assembly is disposed in a rearward portion of a vehicle, the headrest will be in the lowered position when there is no occupant in the seat assembly, and a driver looking rearward from a frontward portion of the vehicle is provided with a less obstructed rear view.

In one aspect of the invention, an occupant detection mechanism operable for detecting the presence of an occupant at the seat is operatively connectable to the releasable headrest restraining mechanism. The releasable headrest restraining mechanism is operable for restraining the headrest in the first position when the occupant detection mechanism does not detect the presence of an occupant, and for releasing the releasable headrest restraining mechanism to the second position when the occupant detection mechanism detects the presence of an occupant at the seat.

In another aspect of the invention, the seat forms a cavity. The headrest is substantially within the cavity when the headrest is in the first position.

In another aspect of the invention, the headrest has an upper most portion and the seat has a top portion. The cavity is designed such that the upper most portion of the headrest does not extend beyond the top portion of the seat when the headrest is in the first position.

In one aspect of the invention, the occupant detection mechanism is disposable in the seat and includes a lever. The lever is movable between undepressed position and depressed position. The lever moves from the undepressed position to the depressed position in response to the presence of an occupant at the seat. The releasable headrest restraining mechanism releases the headrest when the lever is moved to the depressed position.

In another aspect of the invention, the seat assembly includes a cable configured for connecting the lever with the releasable headrest restraining mechanism. The lever is operable for pulling the cable when the lever moves from the undepressed position to the depressed position in response to the presence of an occupant at the seat. The releasable headrest restraining mechanism releases the headrest when the cable is pulled.

In another aspect of the invention, the seat includes a seatback and a seat bottom. The lever may be disposed in either of the seatback or the seat bottom within the scope of the invention.

In another aspect of the invention, the occupant detection mechanism is disposed in the seat. The occupant detection mechanism includes a switch. The switch is operable in response to the presence of an occupant at the seat for sending a communication signal to the releasable headrest restraining mechanism. The releasable headrest restraining mechanism releases the headrest in response to the communication signal.

In another aspect of the invention, the occupant detection mechanism includes a sensor. The sensor is operable for signaling communication with the releasable headrest restraining mechanism. The sensor sends a communication signal to the releasable headrest restraining mechanism when the sensor detects the presence of an occupant at the seat. The releasable headrest restraining mechanism releases the headrest in response to the communication signal.

In another aspect of the invention, the releasable headrest restraining mechanism is movable between a restraining position and a release position. The releasable headrest restraining mechanism restrains the headrest when it is in the restraining position and releases the headrest when it is in the release position.

In another aspect of the invention, the releasable headrest restraining mechanism includes a solenoid having a movable actuator. The occupant detection mechanism is operable for signaling communication with the solenoid. The actuator moves from the restraining position to the release position when the solenoid receives a communication signal from the occupant detection mechanism.

In another aspect of the invention, the seat assembly further includes headrest support structure. The headrest support structure is operable for connecting the headrest with the seat. The headrest support structure is movable with the headrest with respect to the seat. The headrest support structure is releasably matable with the releasable headrest restraining mechanism. The releasable headrest restraining mechanism releasably restrains the headrest support structure such that the headrest is restrained in the first position when the releasable headrest restraining mechanism and the headrest support structure are mated. The releasable headrest restraining mechanism releases from the headrest support structure to permit movement of the headrest to the second position when the occupant detection mechanism detects the presence of an occupant at the seat.

In another aspect of the invention, the biasing element is a spring operably connectable to the headrest support structure. The spring moves from either a compressed position or an extended position to a substantially relaxed position when the releasable headrest restraining mechanism moves from the restraining position to the release position. The movement of the biasing element acts to move the headrest from the first position to the second position.

In another aspect of the invention, the spring is disposable inside of the headrest support structure. For instance, the headrest support structure may be a hollow post with the spring disposed inside of the post.

A method includes restraining a headrest in a first position. The method further includes detecting the presence of an occupant at a seat connected to the headrest. The method further includes, after the detecting step, releasing the headrest such that the headrest is movable to a second position. The method further includes, after the releasing step, moving the headrest from the first position to the second position.

In another aspect of the invention, detecting the presence of an occupant at the seat includes depressing a lever. In this instance, the method further includes pulling a cable. Pulling the cable acts to release the headrest.

A vehicle includes a seat assembly located in an interior passenger space formed by structure of the vehicle. The seat assembly is as described above. The headrest extends higher in the interior passenger space in the second position than in the first position.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIGS. 6A and 6B are schematic side view illustrations in fragmentary view of an alternative shingle-type headrest in a first, lowered position and a second, raised position, respectively;

FIGS. 7A and 7B are schematic side view illustrations in fragmentary view of another alternative (dumping style) headrest for use in the seat assembly of FIG. 1, shown in a first, lowered position and a second, raised position; respectively;

FIG. 8A is a schematic side view illustration of headrest support structure utilizing internal springs and matable with a releasable headrest restraining mechanism;

FIG. 8B is a schematic side view illustration in fragmentary view of alternative headrest support structure employing a telescoping post, shown both in a lowered position and in a raised position (in phantom); and FIG. 9 is a flow diagram illustrating a method of moving a headrest.

DESCRIPTION OF THE PREFERRED EMBODIMENTS

Figure 1:
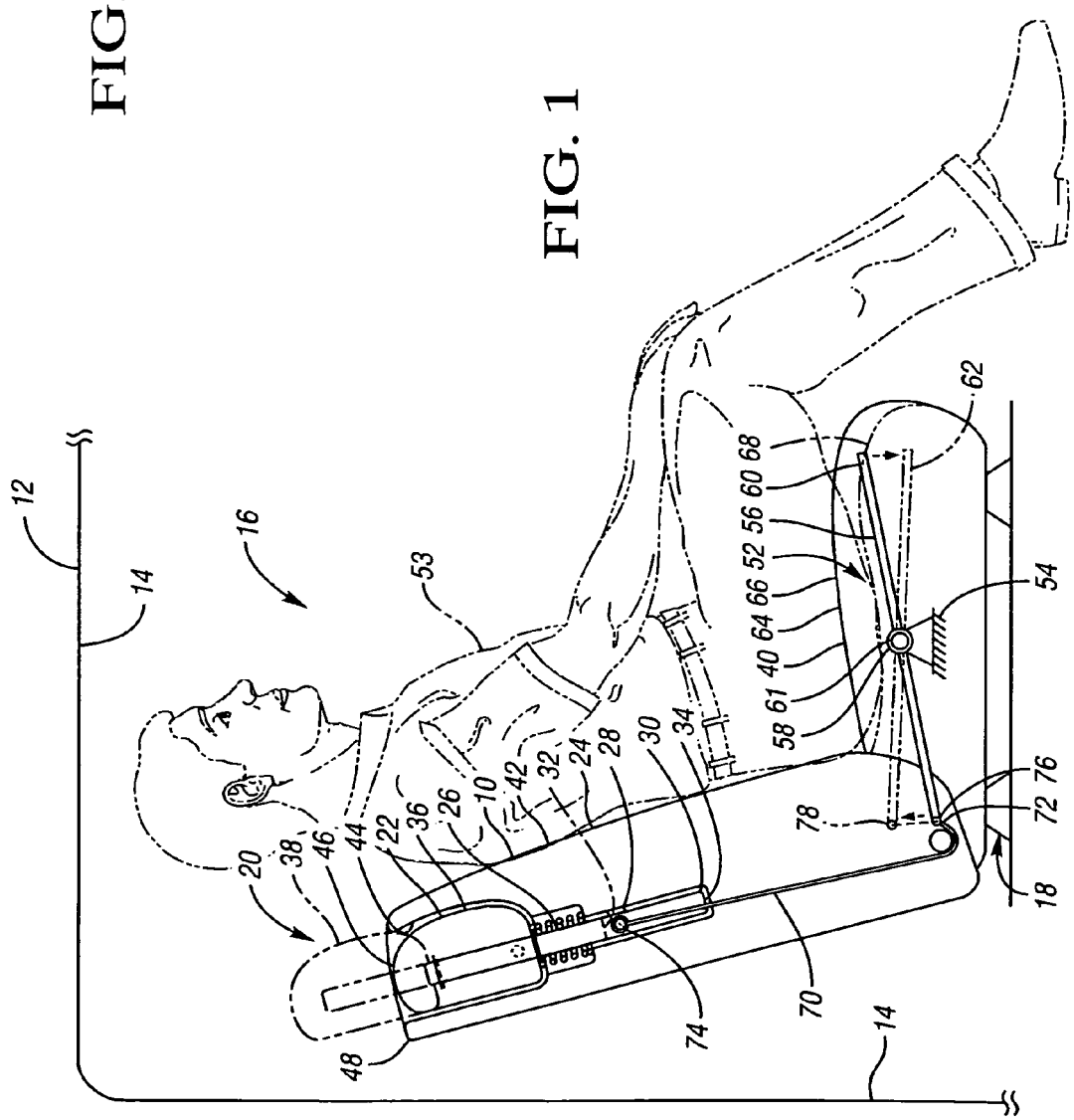
FIG. 1 is a schematic illustration in side view of a first embodiment of a seat assembly located in a vehicle and having an occupant detection mechanism.

Referring to the drawings, wherein like reference numbers refer to like components, FIG. 1 shows a seat assembly 10 disposed in a vehicle 12. The vehicle includes body structure 14 (such as a roof, floor and side panels) which forms an interior passenger space 16. The seat assembly 10 is mounted to the vehicle 12 using mounting attachments 18 such that the seat assembly 10 is disposed in a rearward portion 20 of the interior passenger space 16.

The seat assembly 10 includes a headrest 22 which is connected to a seat 24 via headrest support structure 26. The headrest support structure 26 is preferably in the form of a hollow post, as shown, but may include other mechanisms for attaching the headrest 22 to the seat 24. The headrest support structure 26 is anchored to the seat 24 through an anchoring mechanism 28, as will be known to those skilled in the art. Although anchored to the seat 24, the headrest support structure 26 is movable between a lowered position 30 and a raised position 32, as indicated by the bottom end 34 of the headrest support structure 26 moving from lowered position 30 to raised position 32 (shown in phantom). When the headrest support structure 26 moves from the lowered position 30 to the raised position 32, the headrest 22 moves from the first position 36 to a second position 38 (shown in phantom).

The seat 24 forms seat bottom 40 as well as seat back 42. The seat bottom 40 and the seat back 42 may be separately formed and joined to one another, or may be formed as a unitary seat. The seat back 42 forms a cavity 44. When the headrest 22 is in the first position 36, an uppermost portion of the headrest 46 does not extend beyond a top portion 48 of the seat 24. Additionally, when the headrest 22 is in the first position 36, the headrest 22 is substantially within the cavity 44. Notably, the headrest 22 extends further from the seat 24 when the headrest is in the second position 38 than when it is in the first position 36. Accordingly, the headrest 22 extends higher in the interior of passenger space 16 when it is in the second position 38 than when it is in the first position 36. Thus, a view of a driver looking rearward in the interior passenger space 16 toward the seat assembly 10 is less obstructed when the headrest is in the first position 36 than when it is in the second position 38. Thus, it is desirable to maintain the headrest 22 in the first position 36 unless the headrest 22 is needed for support of an occupant in the seat assembly 10. Accordingly, the seat assembly 10 includes an occupant detection mechanism 52 operable for detecting the presence of an occupant at the seat assembly 10. In the embodiment of FIG. 1, the occupant detection mechanism is disposed in the seat bottom 40 of the seat 24.

Operation of the occupant detection mechanism 52 in relation to the location of the headrest 22 in the first position 36 or in the second position 38 will now be discussed. The occupant detection mechanism 52 is disposed within the seat bottom 40 and is anchored thereto via anchoring structure 54. The occupant detection mechanism 52 includes a lever 56 that is movable about a pivot mechanism 58. The pivot mechanism 58 may be spring-biased by a circular or torsion spring 61 such that the lever 56 is normally maintained (i.e., biased) in an undepressed position 60. The lever 56 is movable to a depressed position 62 (shown in phantom) in accordance with a force such as the weight of an occupant 53 moving a surface 64 of the seat bottom 40 from an undeformed position 66 to a deformed position 68 (shown in phantom).

A cable 70 is operatively connected to the lever 56 at a first end 72. When the lever 56 is moved from the undepressed position 60 to the depressed position 62, the first end 72 of the cable moves from an original position 76 to a response position 78.

Figure 2:
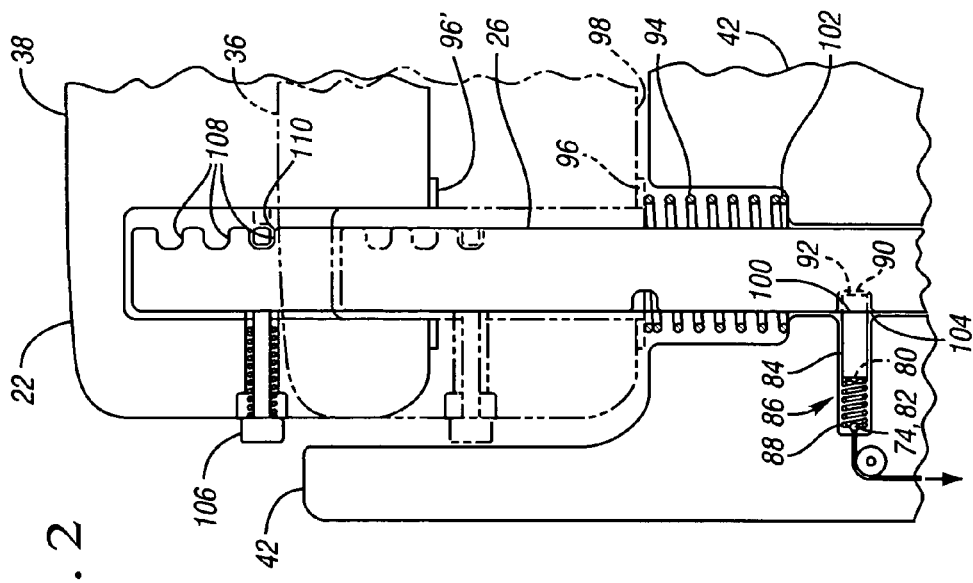
FIG. 2 is a schematic illustration in fragmentary front view of a portion of the seat assembly of FIG. 1.

When the first end of the cable 72 moves from the original position 76 to the response position 78, a second end 74 of the cable moves from an inward position 80 to an outward position 82 (see FIG. 2; "inward" and "outward" being in respect to position with respect to the headrest support structure 26.)

Referring to FIG. 2, the second end 74 of the cable is rigidly connected to a pin 84 which may also be referred to as a detent. The pin 84 is included within a releasable headrest restraining mechanism 86. The releasable headrest restraining mechanism 86 is connected to the seat back 42 of the seat 24. The releasable headrest restraining mechanism 86 further includes a biasing spring 88. The biasing spring 88 retains the pin 84 within a recess 90 formed in the headrest support structure 26. The recess 90 aligns with the pin 84 when the headrest support structure 26 is in the lowered position 30. When the pin 84 is received in the recess 90, the releasable headrest restraining mechanism 86 is in a restraining position 92 (shown in phantom).

A biasing element such as a spring 94 is disposed around the headrest support structure 26. When the headrest support structure 26 is in the lowered position 30 (see FIG. 1), the spring 94 is in a compressed position, creating an upward-biasing upward force. Other biasing elements such as an elastic band or a pneumatic or hydraulic piston may be employed within the scope of the invention. To place the headrest 22 in the first position 36, corresponding with the lowered position 30 of the headrest support structure 26, a manual force is applied to overcome the upward-biasing force of the spring 94. The spring 94 may rest against a support plate 96 mounted to a bottom portion 98 of the headrest 22. When the cable 70 is pulled by the lever 56 such that the second end 74 of the cable moves from the inward position 80 to the outward position 82, the pin 84 likewise moves from the restraining position 92 to a release position 100 (i.e., the pin 84 moves out of the recess 90). (Note that the second end 74 of the cable extends to the inward position 80 when the pin 84 is in the restraining position 92 (shown partially in phantom in FIG. 2)). The movement of the pin 84 releases (i.e., unlatches) the headrest support structure 26, allowing the headrest 22 to move from the first position 36 to the second position 38. Movement of the headrest 22 is due to stored energy in the spring 94 expanding the spring 94 from the compressed position associated with the lowered position 30 of the headrest support structure to a relaxed position (not shown, but extending between the support plate 96' when shown attached to the headrest 22 in the second position 38 and a bottom end 102 of the spring element, the bottom end 102 being fixed to the adjacent seat back 42). Notably, when the headrest support structure 26 is released, the biasing spring 88 of the releasable headrest restraining mechanism 86 retains the pin 84 against the surface 104 of the headrest support structure 26. Thus, when the headrest 22 is manually moved from the second position 38 to the first position 36, recess 90 will be realigned with the pin 84, which will then slide into the recess 90 due to the biasing spring 88. Accordingly, at that point, the releasable headrest restraining mechanism 86 will once again restrain (i.e., latch) the headrest support structure 26, and thereby the headrest 22.

The headrest 22 is equipped with an adjustment pin 106 that permits the headrest to be adjusted to varying heights. The headrest support structure 26 is formed with complementary adjustment recesses 108. The adjustment pin 106 is movable by depression to any of the adjustment recesses 108 to change the overall height of the seat assembly 10 by raising or lowering the headrest, as will be readily understood by those skilled in the art. Preferably, the adjustment pin 106 is disposed in a lower-most adjustment recess 110.

Accordingly, when the headrest 22 is moved to the second position 38, the adjustment pin 106 may be moved to any of the other adjustment recesses 108 to adjust the headrest 22 to a higher position in order to accommodate taller occupants.

Figure 3:
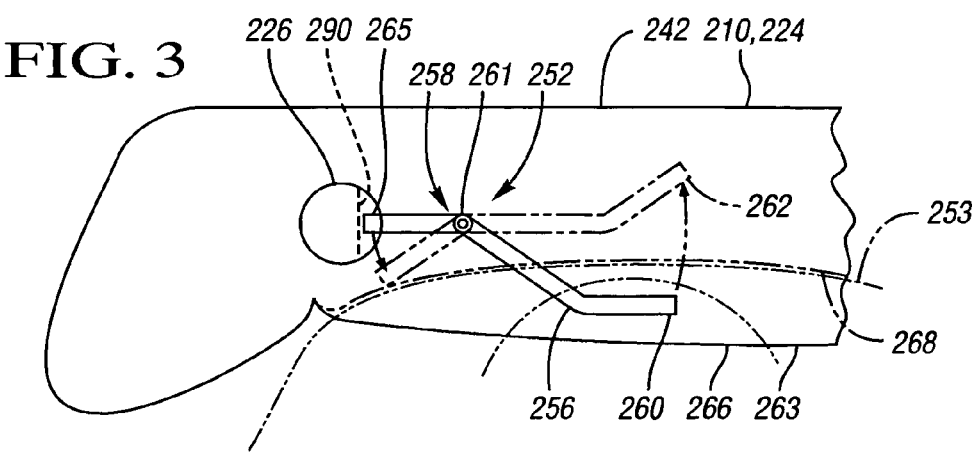
FIG. 3 is a schematic illustration in fragmentary plan view of a second embodiment of a seat assembly including an alternative occupant detection mechanism.

Referring to FIG. 3, a seat assembly 210 includes a seat 224 that has an occupant detection mechanism 252 mounted within a seat back 242. The occupant detection mechanism 252 includes a lever 256 that is biased in an undepressed position 260 by a circular or torsion spring 261 disposed about a pivot mechanism 258. When an occupant 253 leans against the seat back 242, the lever 256 is moved from the undepressed position 260 to a depressed position 262 in correspondence with a surface 263 of the seat back 242 moving from an undeformed position 266 to a deformed position 268 (shown in phantom). Headrest structure 226 is disposed within the seat 224 and is connected to a headrest (not shown) in a manner similar to the connection between the headrest support structure 26 and headrest 22 of FIGS. 1 and 2. The headrest support structure 226 is formed with a recess 290. When the lever 256 is in the undepressed position 260, a retaining end 265 of the lever is captured within the recess 290. However, when the lever 256 is moved to the depressed position 262, the lever 256 pivots via the pivot mechanism 258, moving the retaining end 265 of the lever 256 out of the recess 290. When the retaining end 265 is moved out of the recess 290, the headrest support structure 226 is released from a lowered position to a raised position in the same fashion as the headrest support structure 26 of FIGS. 1 and 2 moves from a lowered position 30 to a raised position 32.

Figure 4:
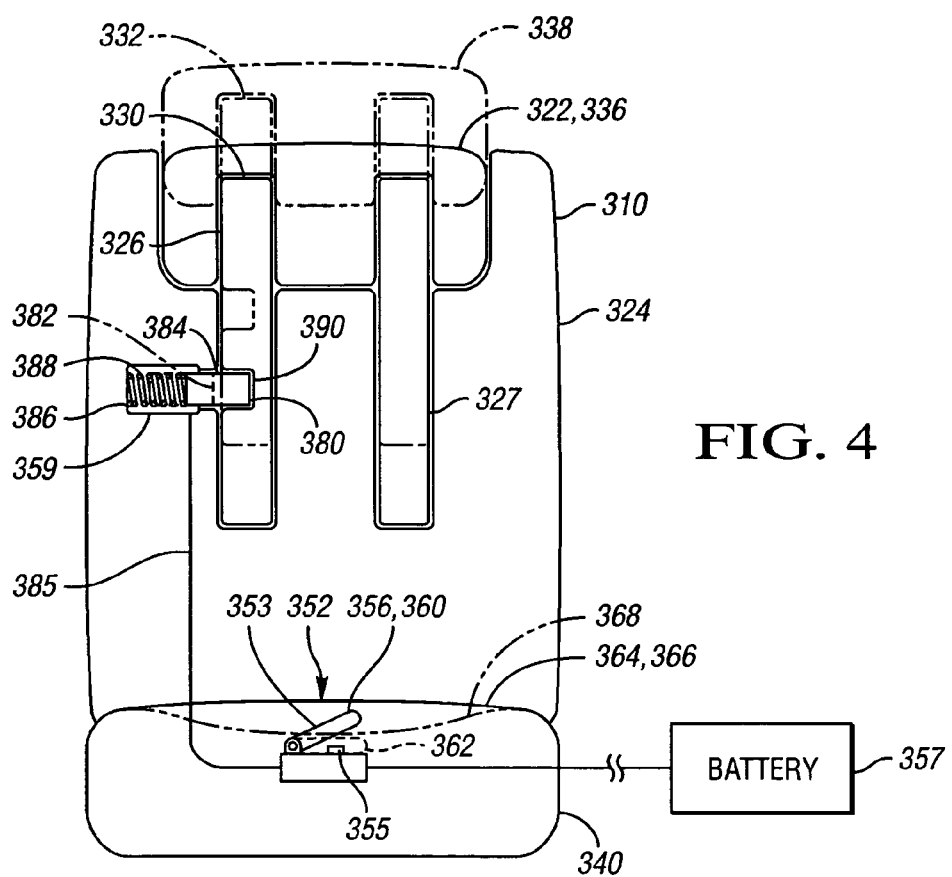
FIG. 4 is a schematic illustration in front view of a third embodiment of a seat assembly including another alternative occupant detection mechanism.

Referring to FIG. 4, a seat assembly 310 includes occupant detection mechanism 352 disposed in a seat bottom 340 of the seat 324. The occupant detection mechanism 352 includes circuit closing means 353 such as a mechanical switch. When an occupant (not shown) sits on the seat bottom 340, a surface 364 of the seat bottom 340 moves from an undeformed position 366 to the deformed position 368, thus moving a lever 356 of the circuit closing means 353 from an undepressed position 360 to a depressed position 362. In the depressed position 362, contact is made with a contact element 355, thus closing a circuit between a power source 357 such as a battery (which may be the main battery powering the vehicle) and a solenoid 359. The solenoid 359 moves an actuator 384 between an inward position 380 and an outward position 382 (shown in phantom). The solenoid 359 is powered to move the actuator 384 by a communication signal 385 (i.e., electrical current) sent from the circuit closing means 353 when the circuit closing means 353 is closed as described above. The actuator 384 moves out of a recess 390 formed in headrest support structure 326, thus allowing stored spring energy to move the headrest support structure 326 from a lowered position 330 to a raised position 332 (shown in phantom) corresponding to movement of attached headrest 322 from a first position 336 to a second position 338. A biasing spring 388 may be employed within the solenoid 359 to bias the actuator 384 against the headrest structure 326 such that the actuator 384 will be moved into the recess 390 when the headrest 322 is repositioned such that the headrest structure 326 is in the lowered position 330, the releasable headrest restraining mechanism 386 thus being in a restraining position again. The solenoid 359, the actuator 384 and the biasing spring 388 are included within a releasable headrest restraining mechanism 386 which operates as described to retain the headrest 322 in the first position 336 when the actuator 384 is in the inward (retaining) position or move to a release position (i.e., the outward position 382) to permit the headrest 322 to move to the second position 338. Notably, the headrest support structure 326 may be in the form of a post. An additional post 327 may likewise be operatively connected to the headrest 322 and movable therewith in response to movement of the headrest support structure 326.

Figure 5:
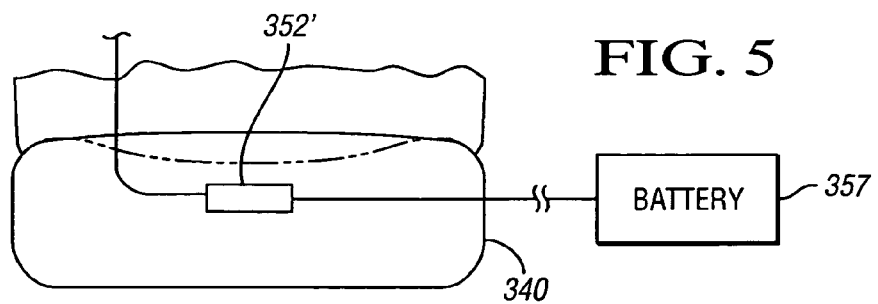
FIG. 5 is a schematic illustration in fragmentary front view of an alternative occupant detection mechanism that may be employed within the seat assembly of FIG. 4 to establish a fourth embodiment of a seat assembly.

Referring to FIG. 5, as an alternative to the levers 56 and 256 shown in FIGS. 1 and 3 and the circuit closing means 353 shown in FIG. 4, an occupant detection mechanism may be in the form of a sensor 352'. A variety of sensor types may be used within the scope of the claimed invention. For instance, a weight-sensing sensor (i.e., employing a strain gauge or the like) or a proximity sensor may be employed to detect the presence of an occupant. Like the circuit closing means 353, the sensor 352' is in signaling communication with the releasable headrest restraining mechanism 386 (see FIG. 4) and is operable to send a communication signal thereto via power from the battery 357 to which it is operatively connected.

Referring to FIGS. 6A and 6B, a headrest 422 may be a shingle-type headrest. Thus, when headrest support structure 426 is released by a releasable headrest restraining mechanism (not shown), the shingle-type headrest will move from a first position 436 shown in FIG. 6A to a second position 438 shown in FIG. 6B.

Another alternative type of headrest 522 (which may be referred to as a dumping headrest) may be employed within the scope of the invention. As shown in FIG. 7A, the headrest 522 may be maintained in a first position 536 (i.e., a lowered or dumped position). Headrest support structure 526 to which the headrest 522 is operatively connected may then be released by a releasable headrest restraining mechanism (not shown) in a manner similar to that described with respect to FIGS. 1-4 to permit the headrest 522 to move to a second position 538. (Those skilled in the art will readily recognize that a cammed track may be employed to permit the headrest 522 to move from the dumped position to the second (raised) position 538.) Alternatively, interference between the headrest 522 and the seat back 542 may maintain the headrest 522 in the first position 536. When the headrest support structure 526 is released, the interference may be overcome to permit the headrest 522 to pivot to the second position 538.

Referring to FIGS. 8A and 8B, it may be seen that a variety of headrest support structures may be used within the scope of the invention. Referring to FIG. 8A, the headrest support structure 626 comprised of an inner post portion 622 connected with an outer post portion 629 via an internal spring 694 is shown. A pin 684 included within a releasable headrest restraining mechanism (not shown) maintains the outer post portion 629 in a lowered position as shown. Movement of the pin 684 (as described with respect to FIGS. 1-3 or as described with respect to the actuator 384 of FIG. 4) allows the outer post portion 629 to be released and the spring 694 to expand thus moving an upper edge 695 of the outer post portion 629 to a raised position (not shown) as will be readily understood by those skilled in the art. The inner post portion 622 is mounted within a seat back 642.

Referring to FIG. 8B, headrest support structure 726 having an outer post portion 729, an inner post portion 722 and a mid post portion 727 may be employed within the scope of the invention. When a releasable headrest restraining mechanism (not shown) is removed from a recess 790 formed in the outer post portion 729, compressed spring energy from a spring element (not shown) may allow the headrest support structure 726 to move from the lowered position 730 to a raised position 732 (partially shown in phantom) in a telescoping fashion as will be readily understood by those skilled in the art.

Referring to FIG. 9, a method 800 of moving a headrest is illustrated. The method 800 includes restraining a headrest in a first position 802. Restraining a headrest 802 may be accomplished by a releasable headrest restraining mechanism releasably matable with headrest support structure as described with respect to FIGS. 1-5 above. The method 800 further includes detecting 804 the presence of an occupant at a seat. The seat is operably connected to the headrest. The method 800 may further include pulling a cable 806. The method may further include releasing the headrest 808 such that it is movable to a second position. As described above with respect to FIGS. 1-2, pulling the cable 70 results in the release of headrest support structure 26 by the releasable headrest restraining mechanism 86 to permit the headrest 22 to move to the second position 38. The method 800 may further include moving 810 the headrest from the first position to the second position. As described above with respect to FIGS. 1 and 2, when the headrest support structure 26 is released, stored energy in the spring element 94 acts to move the headrest 22 from the first position 36 to the second position 38. Stored spring energy may also be used to move the headrest from the first position to the second position in the embodiments shown in FIGS. 3-5 above.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

The invention claimed is:

1. A seat assembly comprising:
    a seat;
    a headrest connectable to said seat and movable between a first position and a second position with respect to said seat;
    a biasing element; wherein said biasing element is operable for biasing said headrest toward said second position;
    a releasable headrest restraining mechanism including a solenoid having a movable actuator;
    an occupant detection mechanism operable for detecting the presence of an occupant at said seat; wherein said occupant detection mechanism is operatively connectable to said releasable headrest restraining mechanism; and
    wherein said releasable headrest restraining mechanism is operable for restraining said headrest in said first position when said occupant detection mechanism does not detect the presence of an occupant and for releasing said headrest to permit movement of said headrest to said second position via said biasing element when said occupant detection mechanism detects the presence of an occupant at said seat;
    wherein said releasable headrest restraining mechanism is movable between a restraining position and a release position; wherein said releasable headrest restraining mechanism restrains said headrest when said releasable headrest restraining mechanism is in said restraining position; and wherein said releasable headrest restraining mechanism releases said headrest when said releasable headrest restraining mechanism is in said release position;

wherein said occupant detection mechanism is operable for signaling communication with said solenoid; and wherein said actuator moves from said restraining position to said release position when said solenoid receives a communication signal from said occupant detection mechanism.

2. The seat assembly of claim 1, wherein said headrest extends further from said seat in said second position than in said first position.

3. The seat assembly of claim 2, wherein said seat forms a cavity; wherein said headrest is substantially within said cavity when said headrest is in said first position.

4. The seat assembly of claim 3, wherein said headrest has an uppermost portion; wherein said seat has a top portion; and wherein said uppermost portion of said headrest does not extend beyond said top portion of said seat when said headrest is in said first position.

5. The seat assembly of claim 1, wherein said occupant detection mechanism is disposable in said seat; wherein said occupant detection mechanism includes a lever; wherein said lever is movable between an undepressed position and a depressed position; wherein said lever moves from said undepressed position to said depressed position in response to the presence of an occupant at said seat; and wherein said releasable headrest restraining mechanism releases said headrest when said lever is moved to said depressed position.

6. The seat assembly of claim 5, further comprising a cable configured for connecting said lever with said releasable headrest restraining mechanism; wherein said lever is operable for pulling said cable when said lever moves from said undepressed position to said depressed position in response to the presence of an occupant at said seat; and wherein said releasable headrest restraining mechanism releases said headrest when said cable is pulled.

7. The seat assembly of claim 5, wherein said seat includes a seat back and a seat bottom; and wherein said lever is disposable in one of said seat back and said seat bottom.

8. The seat assembly of claim 1, wherein said occupant detection mechanism is disposable in said seat; wherein said occupant detection mechanism includes a switch, wherein said switch is operable in response to the presence of an occupant at the seat for sending a communication signal to said releasable headrest restraining mechanism; and wherein said releasable headrest restraining mechanism releases said headrest in response to said communication signal.

9. The seat assembly of claim 1, wherein said occupant detection mechanism includes a sensor; wherein said sensor is operable for signaling communication with said releasable headrest restraining mechanism; wherein said sensor is operable for sending a communication signal to said releasable headrest restraining mechanism when said sensor detects the presence of an occupant at said seat; and wherein said releasable headrest restraining mechanism releases said headrest in response to said communication signal.

10. The seat assembly of claim 1, further comprising:

headrest support structure; wherein said headrest support structure is operable for connecting said headrest with said seat; wherein said headrest support structure is movable with said headrest with respect to said seat; wherein said headrest support structure is releasably matable with said releasable headrest restraining mechanism; wherein said releasable headrest restraining mechanism restrains said headrest support structure such that said headrest is restrained in said first position when said releasable headrest restraining mechanism and said headrest support structure are mated; and wherein said releasable headrest restraining mechanism releases from said headrest support structure to permit movement of said headrest to said second position when said occupant detection mechanism detects the presence of an occupant at said seat.

11. The seat assembly of claim 10, wherein said biasing element is a spring operatively connectable with said headrest support structure; and wherein said spring moves from one of a compressed position and an extended position to a substantially relaxed position when said releasable headrest restraining mechanism moves from said restraining position to said release position, said movement of said spring acting to move said headrest from said first position to said second position.

12. The seat of claim 11, wherein said spring is disposable inside of said headrest support structure.

* * * * *